(12) United States Patent
Rieben et al.

(10) Patent No.: US 11,518,347 B2
(45) Date of Patent: Dec. 6, 2022

(54) HEATABLE CEILING BOOM FOR THE HIGH-PRESSURE WASHING OF VEHICLES

(71) Applicant: Mosmatic AG, Necker (CH)

(72) Inventors: Patrick Rieben, Necker (CH); Daniel Santoro, Necker (CH)

(73) Assignee: MOSMATIC AG, Necker (CH)

( * ) Notice: Subject to any disclaimer, the term of this patent is extended or adjusted under 35 U.S.C. 154(b) by 547 days.

(21) Appl. No.: 16/564,319

(22) Filed: Sep. 9, 2019

(65) Prior Publication Data

US 2020/0079329 A1 Mar. 12, 2020

(30) Foreign Application Priority Data

Sep. 10, 2018 (DE) .................... 10 2018 121 959.8

(51) Int. Cl.
| | | |
|---|---|---|
| *B08B 3/02* | (2006.01) | |
| *B60S 3/04* | (2006.01) | |
| *B08B 1/00* | (2006.01) | |

(52) U.S. Cl.
CPC .................... *B60S 3/04* (2013.01); *B08B 1/00* (2013.01); *B08B 3/026* (2013.01); *B08B 2203/007* (2013.01)

(58) Field of Classification Search
CPC ... B60S 3/04; B60S 3/047; B08B 1/00; B08B 3/026; B08B 3/028; B08B 2203/007; B05B 15/62; B05B 3/06
USPC ........................................................ 134/105
See application file for complete search history.

(56) References Cited

U.S. PATENT DOCUMENTS

2001/0015385 A1* 8/2001 Seyfarth .................. F01P 3/20
239/128

FOREIGN PATENT DOCUMENTS

| DE | 9107952 | U1 | 1/1992 |
|---|---|---|---|
| DE | 1307371 | A1 | 9/1994 |
| DE | 9414483 | U1 | 2/1995 |
| DE | 19642847 | C2 | 8/1999 |
| DE | 10060316 | A1 | 6/2002 |
| DE | 10241829 | A1 | 3/2004 |
| DE | 102007022260 | A1 | 11/2008 |
| JP | H08247346 | A | 9/1996 |

OTHER PUBLICATIONS

DE102007022260A1—machine translation (Year: 2007).*

(Continued)

*Primary Examiner* — Tinsae B Ayalew
(74) *Attorney, Agent, or Firm* — Browdy and Neimark, PLLC

(57) ABSTRACT

A heatable ceiling boom for washing facilities, which is rotatably mounted on a bearing shaft that is fastened to the ceiling or to a wall of a wash box, and which is made up of one or more support arms via which the washing medium is supplied from the bearing shaft to high-pressure hoses leading to the operating means in the form of a washing brush and/or spray lance, for example, wherein the high-pressure hoses have an electrically heatable design, and at least one rotational power distributor is situated on the bearing shaft for supplying electrical energy from the stationary bearing shaft to the support arms rotatably mounted thereon, wherein the electrical heating takes place via a heating cable that is led inside the high-pressure hose with sealing.

17 Claims, 4 Drawing Sheets

(56) References Cited

OTHER PUBLICATIONS

Figure 3:
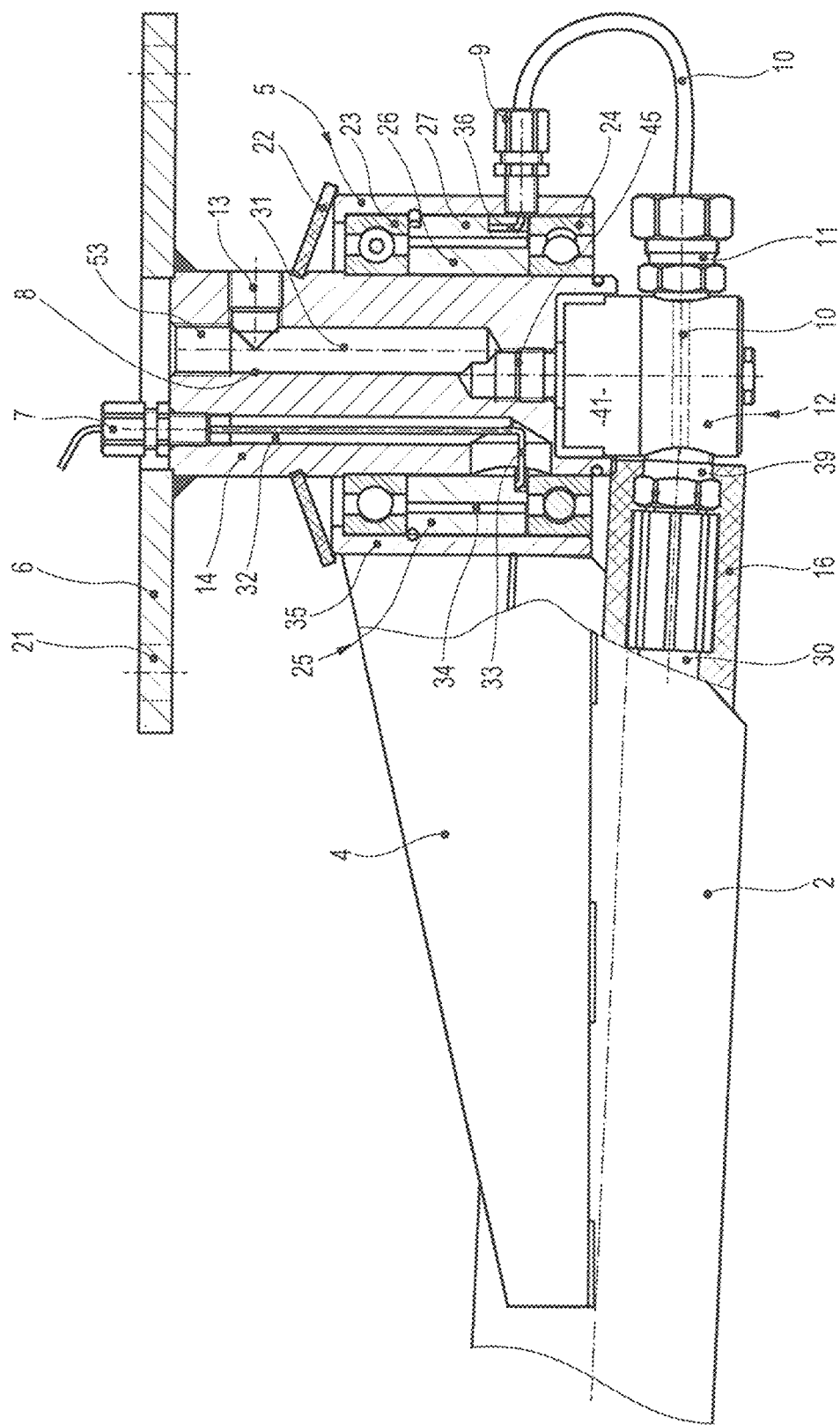

DE4307371A1—machine translation (Year: 1994).*
DE19642847A1 (Year: 1998).*
DE10060316B4 (Year: 2008).*

* cited by examiner

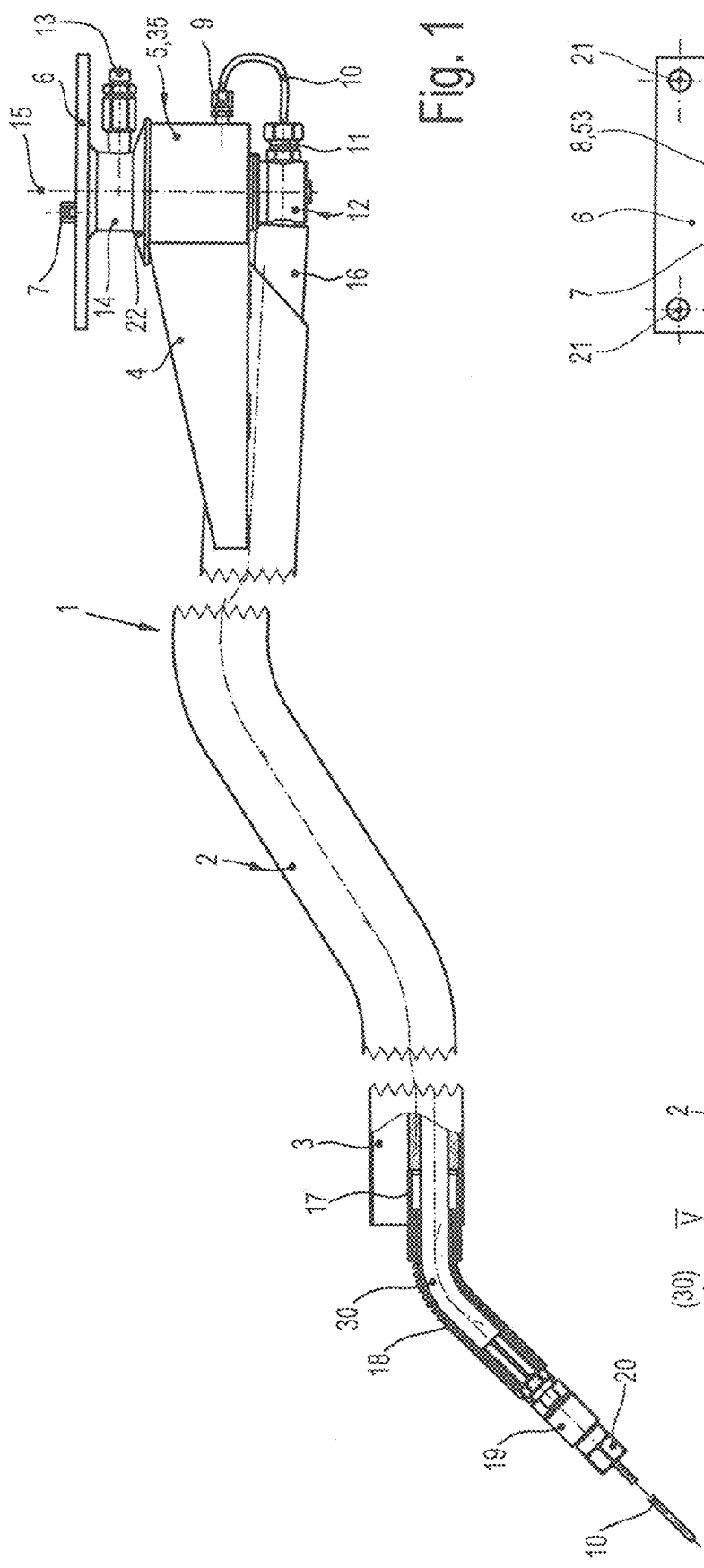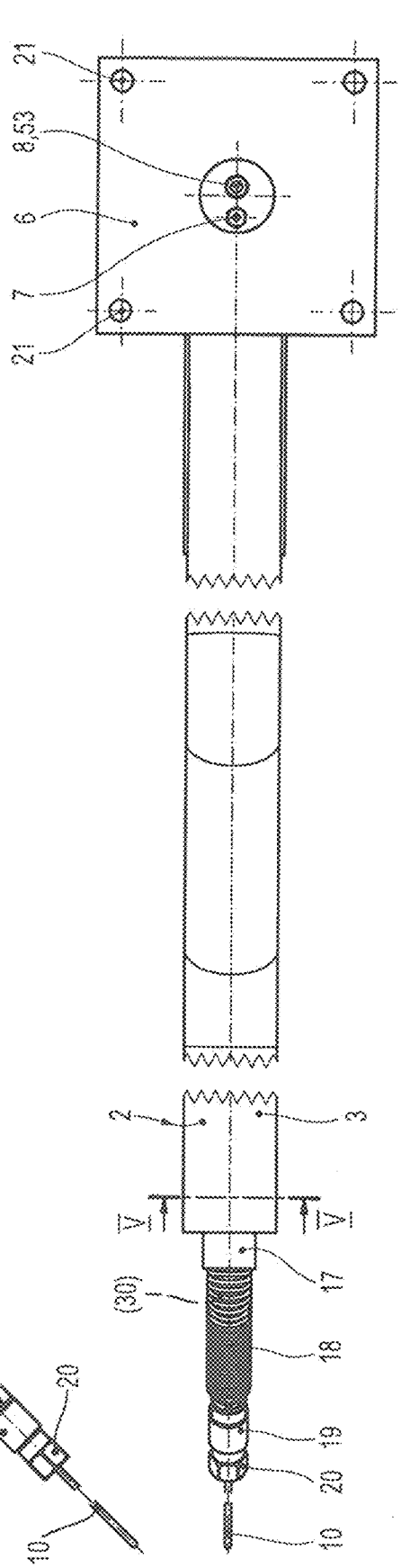

HEATABLE CEILING BOOM FOR THE HIGH-PRESSURE WASHING OF VEHICLES

The invention relates to an electrically heatable ceding boom for the high-pressure washing of vehicles according to the preamble of claim 1.

Ceiling booms according to the preamble of claim 1 are known from the publications DE 10 2007 022 260 A1 DE 196 42 847 C2, DE 102 41 829 A1, or DE 94 14 483 U1 by the present applicant. They are generally stationarily fastened to the ceiling in a building such as a bay, a garage, or the like, and are able to rotate a support arm, connected on one side to a rotary joint, by an angle of at least 360°. They are used for washing aircraft, watercraft, and land-based vehicles; for the sake of simplicity, the following description addresses only the use of such a ceiling boom for washing motor vehicles in bays and the like.

However, the invention is not limited to the washing of vehicles in bays, since the ceiling boom may be mounted on any given solid ceiling surface, and is suitable for conducting a high-pressure medium.

These types of ceiling booms are provided at the ceiling surface with a connection for a high-pressure medium, this high-pressure medium generally being water. Such a ceiling boom is also suitable for wall mounting, and the high-pressure medium is generally a water stream that is under a pressure of preferably between 100 and 150 bar. Use of the heatable ceiling boom in the low-pressure range of 2 bar, for example, is likewise possible. The output side of such known ceiling booms is connected to a high-pressure lance or to a washing brush or the like to allow washing of the vehicle situated in the bay.

Instead of the arrangement of a ceiling boom in a bay, it is of course also possible to install such a known ceiling boom outdoors on suitable mounting surfaces.

Accordingly, the known ceiling booms conduct a high-pressure medium in a high-pressure hose through at least one support arm, the high-pressure medium being introduced on the connection side facing the ceiling or wall, and on the output side the high-pressure medium being supplied to a washing device such as a high-pressure gun, a lance, a washing brush, and the like. These types of ceiling booms are generally used outdoors, i.e., in unheated surroundings, resulting in the disadvantage that there is a risk of freezing for the high-pressure medium that is conducted in the ceiling boom.

It is known from DE 10 2007 022 260 A1, for example, to introduce a high-pressure medium via a pivot bearing, on the ceiling side, into the high-pressure hose situated at the pivot bearing on the output side, the output side of the high-pressure hose being connected to the washing device described above.

Thus, there is a risk of freezing for the high-pressure medium conducted in the high-pressure hose, which is to be prevented.

For this purpose, it is known from DE 91 07 952 U1, for example, to provide heatable ceiling booms in which the heating, however, takes place at the outer circumference of the high-pressure hose. Accordingly, this involves a heating jacket that is connected to the outer circumference of the high-pressure hose in a preferably heat-conducting manner, so that, with suitable power-assisted heating of the heating jacket, the outer circumference of the high-pressure hose is kept at a temperature that is higher than the freezing temperature.

However, a disadvantage of the known heating jacket heating is that the heating jacket has poor heat transfer via the outer circumference of the high-pressure hose to the high-pressure medium conducted in the high-pressure hose, as the result of which the heating effect is low. Accordingly, high power consumption is to be expected, since the heating jacket must be held at high temperatures in order to heat the high-pressure medium inside the high-pressure hose to a temperature above freezing.

Another disadvantage is the operationally vulnerable electrical connection of the heating jacket, since the cable feed into the heating jacket must be introduced at the rotating portion of the support arm, which means that the support arm is limited to a rotational angle of no greater than 360° in order to prevent the power supply wires in the heating jacket from shearing off. Thus, in addition to the limited rotatability of the ceiling boom by less than 360°, there is the further disadvantage that the power leads into the heating jacket are susceptible to breakage, and severe accidents may occur if these power leads break.

Therefore, the object of the invention, proceeding from DE 91 07 952 U1, is to refine a heatable ceiling boom of the type mentioned at the outset in such a way that, with full rotatability of greater than 360°, operationally secure operation of the heating and/or other auxiliary elements is made possible.

To achieve the stated object, the invention is characterized by the technical teaching of claim 1.

A preferred feature of the invention is that the heating cable is guided inside the high-pressure hose. This ensures that the high-pressure medium flows directly around the heating cable, and therefore optimal heat transfer of the heat output of the heating cable directly to the high-pressure medium takes place without a hose jacket in between, as known in the prior art.

In one modified design, however, it may be also be provided that the heating cable is absent in the interior, and instead, a power feed to a heating jacket situated on the outer circumference of the high-pressure hose takes place via the rotational power distributor. A combination of both types of heating is also possible.

The preferred technical teaching of the invention according to the first design presumes that the heating cable is led in a pressure-tight manner into, and optionally also led out from, the interior of the high-pressure hose. In one preferred refinement, the ceiling boom is designed in such a way that it, together with its heating cable, is rotatable by arbitrary multiples of 360 degrees.

It is preferred that the ceiling boom, with its pivot bearing situated on the ceiling side, is nonrotatably connected to a rotational power distributor, via which it is possible to introduce the heating cable and/or additional signal cables from the ceiling side into the rotatable portion of the ceiling boom, which is/are then introduced, coaxially sealed, into the high-pressure hose.

In addition, the invention is not limited to the arrangement of a single heatable ceiling boom in the manner described in DE 102 41 829 A1. Accordingly, it is provided that, also for ceiling booms with double support arms according to DE 91 07 952 U1, in each case interior heating of the respective high-pressure hose takes place within the meaning of the present invention. In that case, a separate rotational power distributor is associated with each support arm. For the sake of simplicity, however, the following description addresses only the interior heating of a single support arm.

In one preferred embodiment of the invention, it is provided that the heating of the high-pressure hose takes place in such a way that at least one power cable is introduced into the rotational power distributor on the ceiling side of the ceiling boom, and is led out on the rotatable portion of the rotational power distributor on the output side, in order to then be introduced, with sealing, into the rotatable portion of the ceiling boom and into the high-pressure hose that discharges at that location.

This design is preferred, since with an interior heating cable that is carried along inside the high-pressure hose, it is possible for the first time to very efficiently heat the high-pressure medium that is conducted in the high-pressure hose, with low power consumption and high heat transfer power.

Thus, via the introduction of a heating cable into the interior of the high-pressure hose, the advantage of lower power consumption, better heat transfer, and faster heating of the high-pressure medium is achieved, and in addition the ceiling boom may be rotated by more than 360°, which was not possible for the heating of the heating jacket known from the prior art.

The multiple rotatability of the ceiling boom with its support arm and the high-pressure hose situated on the support arm is made possible by the rotational power distributor, which is coaxially situated in a rotatably fixed manner on the outer circumference of the pivot bearing.

In one preferred embodiment, the rotational power distributor is made up of an inner ring that is nonrotatably connected to the stationary, nonrotatable bearing shaft of the ceiling boom, and also a rotatably situated outer ring that is coaxial with respect to the inner ring, and that is nonrotatably connected to the rotatable portion of the ceiling boom, namely, the support arm and all other rotatable parts.

The inner ring and the outer ring are connected to one another via slip ring contacts, wherein the slip ring contacts form conductive sector areas which are distributed on the circumference, and which are thus capable of enabling multicore power transmission via the rotational power distributor on the output side of the rotational power distributor, which is nonrotatably connected to the rotatable portion of the rotary joint.

As stated at the outset, there are multiple embodiments of the output side of the rotational power distributor that is connected to the rotatable portion of the ceiling boom:

1. In a first embodiment, on the output side of the rotational power distributor a multicore cable design is provided that is in direct electroconductive connection with the at least two-core heating cable. In this case, the heating cable is introduced into a rotary joint via a high-pressure cable connection with suitable high pressure resistance, and the connection for the high-pressure hose is also situated on the other side of the rotary joint, so that by leading the heating cable through and inserting it into the rotary joint, it is now possible for the first time to guide the heating cable inside the high-pressure hose with sealing.
2. Instead of introducing the heating cable into the interior of the high-pressure hose, in another embodiment it is provided that multiple cables are once again led out at the output of the rotational power distributor, but are then supplied to a heating jacket that encloses the high-pressure hose on the outer circumference.
3. In a third embodiment, it is provided that instead of the multicore power cables for supplying power to the interior or exterior heating cable or the heating jacket, it is provided that additional signal cables are used which are introduced at the outer circumference of the high-pressure hose and enclose same, so that it is possible for the first time to also carry signal cables, situated on the outer circumference of the high-pressure hose, preferably embedded in its jacket, along with the rotating high-pressure hose.

Of course, it is possible to design the hose jacket of the high-pressure hose in such a way that conductive paths may be directly provided at that location to allow a signal transmission from the output of the rotational power distributor, via the high-pressure hose, in the direction of the washing device.

4. In one refinement of the invention, it is provided that in addition to the use of a heating cable, which is preferably internally situated in the high-pressure hose, but also externally on the high-pressure hose, a multicore signal transmission also takes place. Thus, within the scope of the present invention a combination of heating and signal transmission is provided.

Such signal cables may be provided, for example, for illuminating LED elements, and that are situated along the support arm or that enclose the high-pressure hose, or that supply power or signals to the washing device that is connected to the high-pressure hose.

In the preferred embodiment, in which the heating cable is inserted into the interior of the high-pressure hose in a pressure-tight manner, it is presumed that the high-pressure hose is introduced via a suitable high-pressure cable connection rotary joint with resistance to high pressure, and at the same time, the input side of the high-pressure hose is connected at the output side of the rotary joint with resistance to high pressure.

The subject matter of the invention results not only from the subject matter of the individual patent claims, but also from the combination of the individual patent claims with one another.

All information and features disclosed in the application documents, including the abstract, in particular the spatial design illustrated in the drawings, may be claimed as essential to the invention, provided that, alone or in combination, they are novel with respect to the prior art. Use of the terms "essential" or "according to the invention" or "essential to the invention" is subjective, and does not imply that the features thus designated must necessarily be a component or one or more patent claims.

The invention is explained in greater detail below with reference to drawings that illustrate only one implementation approach. In this regard, further features and advantages of the invention that are essential to the invention emerge from the drawings and their description.

In the drawings:

FIG. 1: shows a side view of a ceiling boom according to the invention

FIG. 2: shows the top view of the ceiling boom according to FIG. 1

Figure 4:
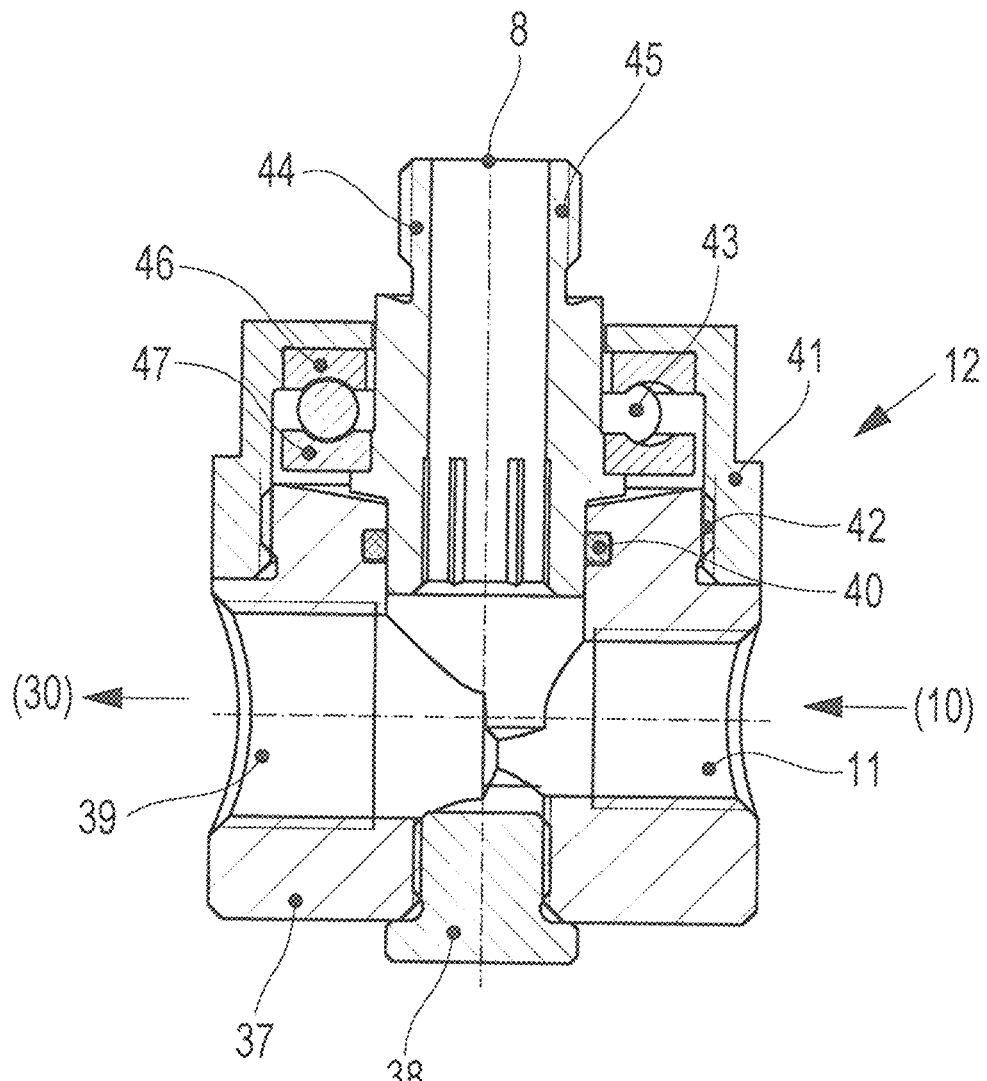
Figure 5:
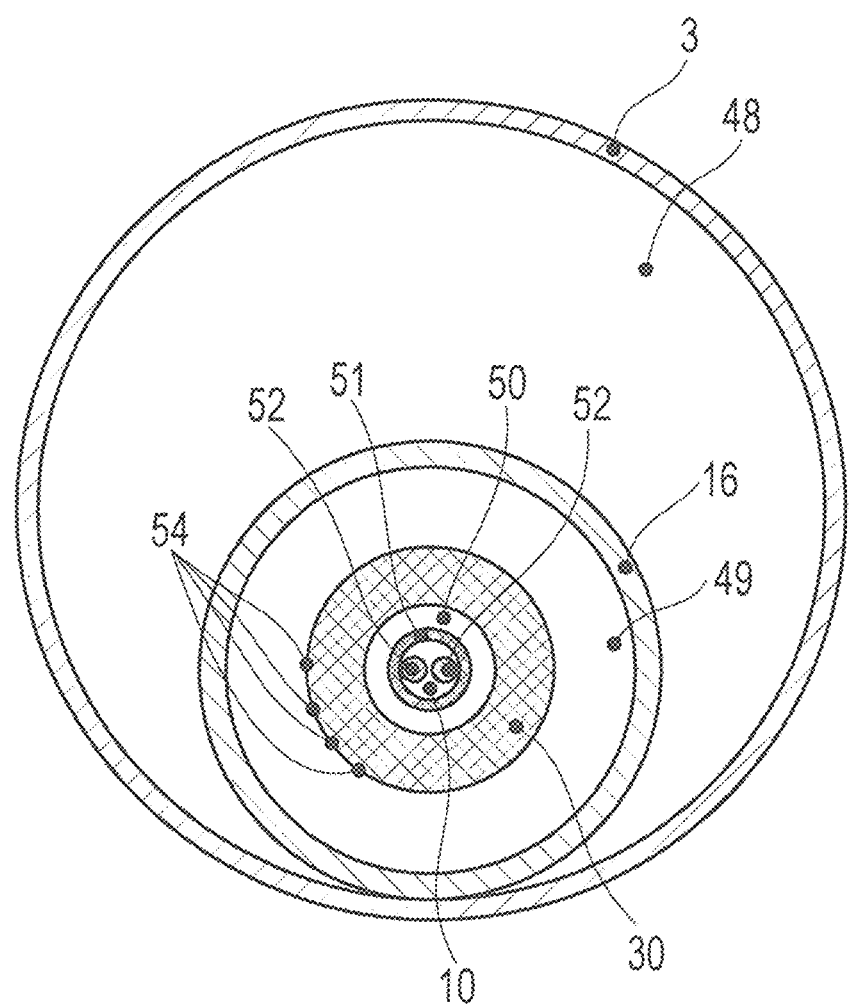

FIG. 3: shows a cross section of the rotary joint of the ceiling boom together with a rotational power distributor FIG. 4: shows an enlarged cross section of the rotary joint FIG. 5: shows a cross section according to the line V-V through the support arm of the ceiling boom.

FIGS. 1 and 2 illustrate a ceiling boom 1 which in the preferred embodiment is equipped with an interior heating cable 10 that is led inside the high-pressure hose 30.

The invention, as stated above, is not limited to this exemplary embodiment.

Starting from a ceiling plate 6, which is fastened to a ceiling by means of fastening screws that extend through fastening holes 21, a bearing shaft 14 is nonrotatably connected to the ceiling plate 6.

According to FIGS. 1 and 2, the bearing shaft 14 leads through the ceiling plate 6, and at that location has a connecting sleeve 7 for introducing an electric cable, and also has a connecting sleeve 8 for introducing the high-pressure medium.

Instead of introducing a high-pressure medium at the connecting sleeve 8, according to FIG. 3 it is also possible to provide a duct 53 at that location for accommodating a heating cartridge, in order to heat the high-pressure stream by electrically heating the heating cartridge.

In this case, the high-pressure medium according to FIG. 1 is introduced at the side via a suitable high-pressure water connection 13, and flows around the heating cartridge.

As stated, the bearing shaft 14 is fixedly connected to the ceiling plate 6, and leads through a pivot bearing 5 which as a whole is made up of different bearing parts, namely, a rotational power distributor 25 and a rotary joint 12 situated beneath it.

The particulars of the design of the pivot bearing 5 are discussed further below.

The pivot bearing 5 has an exterior jacket tube 35 that is connected to the rotatable portion of the ceiling boom 1, and two mutually parallel side plates 4, which accommodate a support arm 2 between them that is preferably made of a metal material, engage with the jacket tube 35.

In the exemplary embodiment shown, the support arm 2 is designed as a circular metal tube, to which the invention is not limited. Other profile shapes of a support arm 2 may also be used, such as a support strut or a strut assembly, so that it is not necessary to lead the high-pressure hose 30 inside the support arm 2. The high-pressure hose may thus also be led on the outer circumference of a support arm.

In the exemplary embodiment shown, however, the support arm 2 is made of a circular metal tube 3, which on its front opening side is connected to a guide tube 17 through which the high-pressure hose 30 is led.

One end of a relieving spring 18 is fastened to the output side of the guide tube 17, and the other end of the relieving spring is fixedly connected to a rotary joint 19 through which the high-pressure hose 30 is led.

A suitable washing device such as a washing brush, a high-pressure gun, or a washing lance may be connected to the connecting nipple 20, also using an intermediate hose for this connection.

Thus, the washing device is not directly connected to the connecting nipple 20, and instead a connecting hose is connected at that location, into which the heating cable 10 extends over any desired length. In another design, however, the heating cable 10 may end in the area of the rotary joint 19 or in front of the rotary joint.

However, the heating cable 10 may also be longer than the connecting hose (not shown), and may be inserted into the washing device in order to heat it as well.

This is a significant advantage of the invention compared to the prior art, since it is thus possible for the first time, using a heating cable 10 that is led inside the high-pressure hose 30, to heat not only the ceiling boom 1 and the portion of the high-pressure hose 30 that is guided there, but also the connecting hose that adjoins the rotary joint 19, and also even the washing device that adjoins the connecting hose.

Accordingly, in the invention it is preferred that a connecting nipple 9 is situated on the pivot bearing 5 on the ceiling side, and that the multicore power cable is led out through the connecting nipple in order to be electroconductively connected to the cable cores 52 of the heating cable 10.

FIG. 1 further illustrates that the high-pressure hose 30 is also enclosed by an insulation hose 16, at least over the length of the ceiling boom, in order to achieve additional thermal insulation.

Furthermore, according to FIG. 3 an upper protective cap 22 is provided to prevent penetration of water from above into the pivot bearing 5.

The rotational axis of the ceiling boom 1 is denoted overall by reference numeral 15.

Further particulars of the pivot bearing 5 in conjunction with the rotary joint 12 situated therebeneath are apparent in FIG. 3.

Starting from the ceiling plate 6, the duct 53 is provided for insertion of a heating cartridge, with the high-pressure water connection 13 opening perpendicularly into the duct, so that the high-pressure medium may be heated when a heating cartridge is inserted into the duct 53.

The connecting sleeve 8 for the introduction of the high-pressure water may therefore perform multiple functions.

The pivot joint 5 is made up essentially of an exterior jacket tube 35 that is nonrotatably connected to the support arm 2 and the side plates 4.

In FIG. 3, two spaced-apart radial bearings 23, 24 are provided, whose inner bearing ring is nonrotatably connected to the stationary bearing shaft 14, while the outer ring is fixedly connected to the jacket tube 35.

Situated in the interior of the jacket tube 35 is the rotational power distributor 25, which is made up essentially of an inner ring 26 that is nonrotatably connected to the bearing shaft 14 via an associated locking ball 29, while the outer ring 27 is nonrotatably connected to the rotating jacket tube 35 via an adjustable grub screw 28.

The power feed via a multicore cable is provided via the upper connecting sleeve 7 and into a longitudinal hole 32 that is guided approximately in parallel to the water duct 31.

The longitudinal hole 32 guides a number of cables, the radial portion of a cable harness 33 in the insertion area at the inner ring 26 being illustrated.

The inner ring 26 is electroconductively connected to the outer ring 27 via a flat annular slip ring 34, wherein a multicore power feed into a cable harness 36 situated on the outer ring 27 on the output side takes place via the slip ring 34 and electrical contacts that make contact at that location. The slip rings may, for example, be made up of electrically conductive circular ring-shaped sector areas that are electrically insulated from one another, wherein, for example, spring-loaded contact pins that are connected to the electrical feed lines are mounted on each sector area.

The contacting of the at least two-core heating cable 10 with the cables that exit from the slip ring contacts takes place in the area of the connecting nipple 9; according to the illustration in FIG. 3, the heating cable is now led out of the connecting nipple 9 with sealing, wherein the seal only needs to be water-tight, but not resistant to high pressure.

The introduction of the heating cable 10 in a pressure-tight manner may also take place via a high-pressure cable connection 11, resistant to high pressure, into the lower rotary joint 12, where, according to the schematic illustration in FIG. 3, the heating cable 30 is now led through the rotary joint 12 and inserted coaxially into the interior of the high-pressure hose 30.

For this purpose, the high-pressure hose is connected to a suitable connecting nipple at the outflow opening 39 of the rotary joint 12, and the high-pressure cable connection 11 is likewise designed in such a way that high-pressure medium cannot penetrate from the outside.

The rotary joint 12 according to FIG. 3 is described in greater detail in FIG. 4. The rotary joint is made up essentially of a rotating housing 37, on the right side of which the connection for the high-pressure cable connection 11 is provided, and on the left side of which the outflow opening 39 for the connection of the high-pressure hose 30 is provided.

The housing 37 has an approximately sleeve-shaped design, and via an O-ring 40 rests with sealing against the outer circumference of the fixed screw sleeve 45.

The screw sleeve 45 has a screw terminal 44, to which the rotary joint 12 together with the bearing shaft 14 is connected according to FIG. 3.

According to FIG. 4, the rotary joint 12 is made up of an axial bearing 43 that forms two separate bearing rings 46, 47. Known rolling elements such as balls, rollers, or the like are situated between the bearing rings 46, 47.

The top bearing ring 46 is nonrotatably connected to the housing 37 of the rotary joint 12 via a screw connection 42, while the other bearing ring 47 is nonrotatably connected to the screw sleeve 45, which in turn is nonrotatably connected to the bearing shaft 14.

For improved installation, it is also provided that a sealing plug 38 is situated on the bottom side of the housing 37 to allow the screw sleeve 45 to be screwed onto the bearing shaft 14.

FIG. 5 illustrates a cross section of the support arm 2, which in the exemplary embodiment shown is designed as a circular tube 3.

Situated in the cavity 48 of the circular tube 3 is an insulation hose 16 which in its interior 49 accommodates the high-pressure hose 30, which in turn in its interior 50 accommodates the heating cable 10 provided with multiple cable cores 52.

The heating cable 10 is thus freely guided inside the high-pressure hose 30, and the high-pressure medium flows around it. The heating cable does not result in flow obstruction, since its cross section is significantly smaller than the inner cross section of the high-pressure hose.

Instead of a two-core cable core 52, multiple cores may also be led inside the heating cable 10. The heating cable 10 preferably has an insulating jacket 51.

It may be provided that the insulation hose 16 encloses the outer circumference of the high-pressure hose 30 in a form-fit manner without formation of a space-containing interior 49.

In the introduction to the description, it was mentioned that in addition to the internal guiding of the heating cable 10, it is also possible to provide signal guiding at the outer circumference of the high-pressure hose.

In this case, according to FIG. 5 a number of signal cables 54 may also be guided at the outer circumference of the high-pressure hose, wherein these signal cables are either likewise current-conducting to conduct a heating current, or conduct a signal current.

It was also mentioned that a double arrangement with a two-arm ceiling boom 1 is possible. In this case, an arrangement according to DE 94 14 483 U1 is selected, and a separate rotational power distributor 25 is then associated with each pivot bearing 5 for each support arm 2.

LIST OF REFERENCE NUMERALS 1 ceiling boom
2 support arm
3 circular tube
4 side plate
5 pivot bearing
6 ceiling plate
7 connecting sleeve (electrical)
8 connecting sleeve (water)
9 connecting sleeve (electrical)
10 heating cable
11 high-pressure cable connection
12 rotary joint
13 high-pressure water connection
14 bearing shaft
15 rotational axis
16 insulation hose
17 guide tube
18 relieving spring
19 rotary joint
20 connecting nipple
21 fastening hole
22 protective cap
23 radial bearing (top)
24 radial bearing (bottom)
25 rotational power distributor
26 inner ring
27 outer ring
28 grub screw
29 locking ball
30 high-pressure hose
31 water duct
32 longitudinal hole (electrical)
33 cable harness (incoming)
34 slip ring
35 jacket tube
36 cable harness (outgoing)
37 housing (of 12)
38 sealing plug (of 12)
39 outflow opening
40 O-ring
41 outer housing (of 12)
42 screw connection
43 axial bearing (of 12)
44 screw terminal (of 12)
45 screw sleeve
46 bearing ring (top)
47 bearing ring (bottom)
48 cavity
49 interior (of 16)
50 interior (high-pressure hose 30)
51 insulating jacket (of 10)
52 cable core
53 duct (for heating cartridge)
54 signal cable

The invention claimed is:

1. A heatable ceiling boom for washing facilities, which is rotatably mounted on a bearing shaft that is fastened to the ceiling or to a wall of a wash box, and which comprises one or more support arms via which a pressurized washing medium is supplied from the bearing shaft to a hose that conducts the pressurized washing medium to a washing brush and/or spray lance, wherein the hose has an electrically heatable design, and at least one rotational power distributor is situated on the bearing shaft for supplying electrical energy from the stationary bearing shaft to the support arms rotatably mounted thereon, wherein a heating cable for providing the electrical heating is disposed and sealed inside the hose, wherein electrical lines for the heating cable and electrical signal cables that are carried along internally or externally with the hose, are led via the at least one rotational power distributor.

2. The ceiling boom according to claim 1, wherein the ceiling boom together with the heating cable is rotatable by arbitrary multiples of 360 degrees.

3. The ceiling boom according to claim 1, wherein at least one power cable is introduced into the rotational power distributor on the ceiling side of the ceiling boom, is led out through a connecting nipple on the rotatable portion of the rotational power distributor on the output side, and is introduced, with sealing, into the hose on the support arm side via a cable connection having a predetermined pressure resistance.

4. The ceiling boom according to claim 1, wherein the heating cable passes diametrically and coaxially through the rotatable portion of the rotary joint of the ceiling boom in the hose connected at that location.

5. The ceiling boom according to claim 1, wherein the pivot bearing of the ceiling boom has an exterior jacket tube that is connected to the rotatable portion of the ceiling boom, and two mutually parallel side plates which accommodate the support arm between them engage with the jacket tube.

6. The ceiling boom according to claim 1, wherein the support arm comprises a circular metal tube, the metal tube having a front opening side connected to a guide tube through which the hose is led.

7. The ceiling boom according to claim 6, wherein a first end of a relieving spring is fastened to an output side of the guide tube, and a second end of the relieving spring is fixedly connected to a rotary joint through which the hose is led.

8. The ceiling boom according to claim 1, wherein the heating cable that is led inside the hose extends into the connecting hose, situated on a connecting nipple, for connecting the operating means.

9. The ceiling boom according to claim 1, wherein the internally heated hose is enclosed at an outer circumference by a heat-insulating insulation hose.

10. A heatable ceiling boom for washing facilities, which is rotatably mounted on a stationary bearing shaft that is fastened to the ceiling or to a wall of a wash box, the boom comprising:
an electrically heatable hose that conducts the pressurized washing medium to a washing brush and/or spray lance,
one or more support arms rotatably mounted on the stationary bearing shaft for supplying a pressurized washing medium from the stationary bearing shaft to the electrically heatable hose,
at least one rotational power distributor disposed on the stationary bearing shaft for supplying electrical energy from the stationary bearing shaft to the support arms,
a heating cable for providing the electrical heating disposed and sealed inside the hose, and
electrical lines for the heating cable and electrical signal cables that are carried along internally or externally with the hose and are guided through the at least one rotational power distributor.

11. The heatable ceiling boom according to claim 10, further comprising a pivot bearing comprising the rotational power distributor, a rotary joint disposed beneath the rotational power distributor, and a jacket tube connected to a rotatable portion of the heatable ceiling boom.

12. The heatable ceiling boom according to claim 11, wherein the rotational power distributor comprises:
an inner ring nonrotatably connected to the bearing shaft,
an outer ring fixedly connected to the jacket tube, and
a flat annular slip ring disposed between the inner ring and the outer ring, to electroconductively connects the inner ring to the outer ring.

13. The ceiling boom according to claim 10, further comprising:
a connecting nipple disposed on a rotatable portion of the rotational power distributor,
at least one power cable introduced into the rotational power distributor on a ceiling side of the ceiling boom and led out through on an output side of the connecting nipple, the power cable being sealingly introduced into the hose on the support arm side via a cable connection having a predetermined pressure resistance.

14. The ceiling boom according to claim 10, wherein the heating cable passes diametrically and coaxially through the rotatable portion of the rotary joint of the ceiling boom in the hose.

15. The ceiling boom according to claim 10, wherein the pivot bearing of the ceiling boom has an exterior jacket tube that is connected to the rotatable portion of the ceiling boom, and two mutually parallel side plates which accommodate the support arm therebetween engage with the jacket tube.

16. The ceiling boom according to claim 10, wherein the support arm comprises a circular metal tube, the metal tube having a front opening side connected to a guide tube through which the hose is led.

17. The ceiling boom according to claim 16, further comprising a relieving spring, the relieving spring having a first end fastened to an output side of the guide tube, and a second end fixedly connected to a rotary joint through which the hose is led.

* * * * *